United States Patent Office 3,546,323
Patented Dec. 8, 1970

3,546,323
GRAFT POLYMERS OF VINYL HALIDE MONOMERS AND MERCAPTO-FUNCTIONAL DIENE POLYMERS
Jesse C. H. Hwa and Stanley B. Mirviss, Stamford, Conn., assignors to Stauffer Chemical Company, New York, N.Y., a corporation of Delaware
No Drawing. Filed Nov. 7, 1967, Ser. No. 681,120
Int. Cl. C08f 15/04, 27/06
U.S. Cl. 260—879                                33 Claims

ABSTRACT OF THE DISCLOSURE

Vinyl halide polymers which exhibit improved processing characteristics without sacrificing physical properties are prepared by polymerizing vinyl halide monomer in the presence of a minor amount and preferably from about 0.05% to about 10.0% by weight based on the total weight of monomer of a polymerizable, organosolvent soluble, unsaturated diene polymer having pendant mercaptan groups. The polymers can be based on aliphatic diene polymers such as polybutadiene, styrene/butadiene copolymer, synthetic polyisoprene, or natural rubber. The monomer is preferably 100% vinyl chloride though minor amounts of other ethylenically unsaturated monomers can also be used.

---

The present invention is directed to a process for preparing vinyl halide polymers which exhibit improved processing characteristics without sacrificing physical properties. Particularly, the present invention relates to vinyl halide polymers prepared by polymerizing a monomer composition which is predominantly vinyl halide in the presence of a minor amount, e.g., less than about 50% by weight based on the total weight of monomer in the monomer composition, of a polymerizable, organosolvent soluble, unsaturated diene polymer having pendant mercaptan groups.

Vinyl halide polymers can be prepared in a wide variety of molecular weights, those of higher molecular weight generally having better physical properties such as hardness than those of lower molecular weight. However, the higher the molecular weight of the polymer, the more difficult it is to process into final products. In milling and extruding, the higher molecular weight polymers require more shear force and/or higher temperature to fluidize the polymer as compared to lower molecular weight materials. The increased shear force and/or the increased temperature increases the internal temperature of the polymer. Since vinyl halide polymers are thermally unstable and degrade in the presence of heat, this increase in internal temperature of the polymer is disadvantageous. Also, the use of increased shear forces requires the input of additional work energy as compared to polymers of lower molecular weight and this additional work energy adds to the cost of processing the polymer.

It has now been unexpectedly found that vinyl halide polymers of medium and high molecular weight can be prepared which exhibit improved fluxing or flowing characteristics without sacrificing physical properties so as to allow for easier processing of the polymer.

In accordance with the present invention, there is provided a process for preparing vinyl halide polymers which exhibit improved processing characteristics without sacrificing physical properties, which process comprises polymerizing in the presence of a free-radical initiator an ethylenically unsaturated monomer composition containing a predominant amount of vinyl halide monomer of the formula:

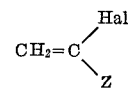

wherein Z is hydrogen or halogen and Hal means halogen, the term halogen as used herein including fluorine, chlorine, bromine, and iodine, in the presence of a minor amount, e.g., less than 50% by weight based on the total weight of monomer in the monomer composition, of a polymerizable, organosolvent soluble, unsaturated diene polymer having pendant mercaptan groups. Surprisingly, the polymers formed are thermoplastic polymers of high molecular weight which are characterized by a decrease in melt flow viscosity under shear so as to provide improved processing characteristics as compared to polymers of equal molecular weight formulated by polymerization in the absence of the mercapto-functional diene polymer. The decrease in the melt flow viscosity under shear allows for the processing of the polymer under thermal conditions which are less conducive to degradation and this is accomplished without sacrificing the physical properties which the polymer is capable of providing.

The exact chemical nature of the polymer which is formed by the process of the present invention is not known. In theory, it is believed that a graft copolymer is formed between the vinyl halide and the mercapto-modified diene polymer. It is theorized that polymer chains in the final polymer extend from the mercapto-modified diene polymer backbone by means of carbon to carbon linkages formed through the unsaturation of the diene polymer and by carbon to sulfur linkages formed through the pendant mercaptan groups. The foregoing is theory and applicant is not intended to be bound thereby.

The vinyl halide monomers included within the formula given above that can be used in the present invention include, for example, vinyl fluoride, vinyl chloride, vinyl bromide, vinyl iodide, vinylidene fluoride, vinylidene chloride, vinylidene bromide, vinylene iodide and the like, though vinyl chloride is preferred. The formula is intended to include all α-halo-substituted ethylenically unsaturated materials which are included within the limits of the formula and which are capable of entering into an addition polymerization reaction. The polymers of the present invention can be formed of the same or different monomer materials falling within the formula and, thus, the invention is intended to cover homopolymers, copolymers, terpolymers, and interpolymers formed by the addition polymerization of the materials falling within the formula. Illustrative of these copolymers is a copolymer of vinyl chloride and vinylidene chloride. The term vinyl halide as used in the claims is intended to include both homo- and copolymers of compounds falling within the given formula.

While it is preferred that the monomer composition be comprised totally of vinyl halide monomer, the present invention is also intended to include copolymers formed by the free-radical addition polymerization of a monomer composition containing a predominant amount, e.g., at least 50% of vinyl halide and a minor amount, e.g., up to 50% by weight of another ethylenically unsaturated monomer material comploymerizable therewith. Preferably, the other ethylenically unsaturated monomer material is used in amounts of less than 25% by weight and more preferably in amounts less than 10% by weight of the total monomer materials used in preparing the polymer. Suitable ethylenically unsaturated monomer materials which can be used are those which can be copolymerized with the vinyl halide monomer and which do not have reactive groups which would interfere with the reactive nature of the mercaptan group and prevent the mercaptan from performing its chemical function in the reaction mixture so as to provide the desired final product. Illustrative of suitable material which can be used to form copolymers, terpolymers, interpolymers and the like are the following: monoolefinic hydrocarbons, i.e., monomers containing only carbon and hydrogen, including such materials as ethylene, propylene, 3-methyl-butene-1, 4-methylphentene-1, pentene-1, 3,3-dimethyl-butene-1, 4,4-dimethylbutene-1, octene-1, decene-1, styrene and its nuclear or alpha-alkyl or aryl substituted derivatives, e.g., o-, m- or p-methyl, ethyl, propyl or butyl styrene; alphamethyl, ethyl, propyl or butyl styrene; phenyl styrene; and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates; alkyl methacrylates, e.g., methyl, ethyl, propyl and butyl methacrylate; octyl methacrylate, alkyl crotonates, e.g., octyl; alkyl acrylates, e.g., methyl, ethyl, propyl, butyl, 2-ethyl hexyl, stearyl, hydroxyethyl and tertiary butylamino acrylates; isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alpha-bromoacrylate, ethyl alpha-bromoacrylate, methyl alpha-fluoroacrylate, ethyl alpha-fluoracrylate, methyl alpha-iodoacrylate and ethyl alpha-iodoacrylate; alkyl alpha-cyanoacrylates, e.g., methyl alpha-cyanoacrylate and ethyl alpha-cyanoacrylate; maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethyl-hexyl ether, vinyl 2-chloroethyl ether, vinyl cetyl ether and the like; and vinyl sulfides, e.g., vinyl β-chloroethyl sulfide, vinyl β-ethoxyethyl sulfide and the like can also be included. Diolefinically unsaturated hydrocarbons containing two olefinic groups in conjugated relation and the halogen derivatives thereof, e.g., butadiene-1,3; 2-methyl-butadiene-1,3; 2,3-dimethyl-butadiene-1,3; 2-chloro-butadiene-1,3; 2,3-dichloro-butadiene-1,3; and 2-bromo-butadiene-1,3 and the like.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and the acrylate or methacrylate ester, vinyl chloride and/or vinylidene chloride and vinyl alkyl ether. These are given as illustrative of the numerous combinations of monomers possible for the formation of copolymers. The present invention is intended to cover all such combinations which fall within the scope of the present invention. While these combinations are intended to be included within the scope of the present invention, it is preferred that the polymer be formed from pure vinyl halide monomer and most preferably pure vinyl chloride.

The free-radical polymerization of the monomer composition is conducted in the presence of a polymerizable, organosolvent soluble, unsaturated aliphatic diene homopolymer or copolymer which has pendant mercaptan groups. Polymerizable, as used herein, is intended to indicate the presence of at least three functional groups from which or through which chain grafting can be accomplished. Of these three, at least one is a carbon to carbon double bond and one is a pendant mercaptan group. The carbon to carbon double bonds can be in the main molecular chain of the diene polymer or in side or pendant chains. The mercaptan groups (—SH groups) can be attached directly to the main chain and/or attached to organic radicals branching from the main polymer chain. The term pendant mercaptan groups is intended to include both of the aforementioned attachments. Preferably, each molecule of the diene polymer has at least an average of 3 carbon to carbon double bonds and an average of 3 pendant mercaptan groups per molecule. The diene polymer must also be organosolvent soluble which is intended to mean solubility in an organic solvent which is compatible with the polymerizaton reaction or solublity in the monomer used to form the polymer. The molecule weight of the diene polymer can vary anywhere from about 300 to about 100,000, the minimum molecular weight being that which will provide the three functional groups hereinbefore described for any specific polymer system. Preferably, diene polymers having an apparent molecular weight as measured by solution viscosity of below about 20,000 and more preferably below about 5,000 are used. The diene polymer can be liquid or solid as desired. Most preferably, the diene polymer is a low molecular weight liquid material having a molecular weight of below about 2,500 and particularly between about 1,000 and about 2,500.

The diene polymers having pendant mercaptan groups can be based on both natural and synthetically prepared polymers having available unsaturation and can be prepared by modifying the same using such methods as partially reacting the available unsaturation with $H_2S$ in the presence of a suitable catalyst such as a peroxide, azobisisobutyronitrile, ultraviolet light, persulfate, gamma radiation, etc. This can be done with or without a solvent or in aqueous emulsion. Preferably, the diene polymers are formed from open-chain conjugated aliphatic dienes having from 4 to 8 carbon atoms. Specific examples of diene polymeric base materials which can be used in the present invention are natural polymers such as natural rubber, which is essentially a polymer of isoprene, chlorinated rubber, masticated or oxidized rubber, reclaimed rubber, balata and gutta percha.

Synthetic diene polymers can also be used. The synthetic diene polymers are preferably formed from open-chain conjugated aliphatic dienes having from 4 to 8 carbon atoms. The synthetic diene polymers can be in the cis-1,4-, trans-1,4-, the 1,2- or in the 3,4- form and mixtures thereof. Diene polymers high, e.g., at least about 65%, in 1,2-content, i.e., with pendant vinyl groups, are particularly suitable for use in preparing the mercapto-modified diene polymers used in the invention in that the vinyl groups are more reactive with $H_2S$ in the presence of the free-radical type catalysts. A more preferred group of diene polymers are those having at least about 80% 1,2- content. These polymers high in 1,2- content are prepared with anionic catalysts and especially by alkali metal or alkali metal alkyl or aryl catalysts such as sodium or lithium metal or lithium or sodium alkyls, e.g., lithium butyl, in particularly a polar solvent such as tetrahydrofuran, triethyl amine, N,N,N',N'-tetramethylethylenediamine, dioxane, and the like. Other solvents such as toluene, xylene can also be used.

Cis-1,4- and trans-1,4- polymers can also be mercaptan modified by the same process as the 1,2-type polydienes and hence can be used for the purposes of this invention. By using Friedel-Crafts (cationic) catalysis, mixtures of various types of polydienes are obtained, e.g., trans and cis-1,4- and 1,2-. Free-radical polymerization catalysts such as peroxides or persulfates can be made to give mostly cis-1,4- with some trans-1,4- and a little 1,2-type polymer. Polymers prepared by these methods generally contain mixtures of the various types of chains or units, e.g., a polymer chain containing some trans-1,4-, cis-1,4- and 1,2-units, which mixtures are useable in preparing the mercapto-modified diene polymers for use in the invention.

Synthetic base polymers can be illustrated by cis-1,4- polybutadiene, cis-1,4-polyisoprene, cis-1,4-poly-2,3-dimethylbutadiene, polychloroprene, and the like; the "synthetic natural" rubbers such as cis-1,4- head to tail polyisoprene and other polymers obtained from 1,3-dienes by means of directive polymerization; polypentadiene-1,3, polycyclopentadiene, polyhexadiene-2,4, polyheptadiene-2,4 and the like. A preferred homopolymeric base material is the butadiene type polymer, e.g., from a diene having 4 carbon atoms in the main molecular chain and derivatives thereof, the 1,2-type polymers being preferred.

Diene copolymers, terpolymers, interpolymers and other multicomponent diene polymers can also be employed as base diene polymers. Also, copolymers with olefins are included, e.g., butadiene-styrene. The term "polymerizable, organosolvent soluble, unsaturated diene polymer having pendant mercaptan groups" is intended to include not only mercapto-functional diene homopolymers but also mercapto-functional copolymers, terpolymers and interpolymers of dienes with other copolymerizable materials. A preferred copolymeric material is a copolymer of the butadiene type, e.g., from a diene having 4 carbon atoms in the main molecular chain and derivatives thereof. Copolymeric diene polymers generally contain at least 50% by weight of the diene and preferably from about 55% to about 90% by weight diene. Diene copolymers can be illustrated by GRS rubber, e.g., styrene/butadiene copolymer of a wide variety of proportions though generally of a 25/75 weight percent ratio styrene/butadiene or the oily copolymer made with a sodium metal catalyst; nitrile rubber, a copolymer of butadiene and acrylonitrile and/or styrene; ethylene-butadiene copolymer made with a Ziegler-Natta catalyst.

Other ethylenically unsaturated monomers which can be utilized to form copolymers are illustrated by substituted vinyl derivatives such as styrene, methyl styrene, chlorostyrene, 2,3-dichlorostyrene, vinyl napthalene, vinyl pyridine, ring-substituted styrenes such as o-, m-, or p-methyl or ethyl styrene and also other polymerizable vinyl carbocyclic and vinyl heterocyclic aromatics; vinyl chloride, vinyl acetate, vinyl propionate, vinylidene dichloride, acrylic or methacrylic acids and their lower alkyl esters such as the methyl, ethyl, or butyl esters, ethylenically unsaturated diacids and their anhydrides such as fumaric and maleic and their esters, acrylonitrile, vinyl ethers such as methyl vinyl ether and divinyl ether, mono-olefins such as ethylene, propylene, butene-1, and isobutylene, as well as the monomeric forms of the homopolymers listed above such as butadiene, cyclopentadiene, 1,3-pentadiene, isoprene and chloroprene. Preferably, the base polymer is a polybutadiene, polyisoprene, or butadiene/styrene copolymer having a molecular weight of between about 500 and about 2,500.

Other copolymers formed with the dienes can be prepared by the known method of reacting an ethylenically unsaturated compound having a "protected thiol group" with the diene. Following polymerization, the protected thiol group which is now pendant to the polymer backbone is removed chemically and the free mercaptan group is regenerated. Exemplary of this method is the copolymerization of butadiene and thioacetyl styrene or vinyl thioacetate or 1-thioacetyl-3-butene followed by the hydrolysis of the thioacetate group to form the free mercaptan.

The foregoing concept can also be used to modify preformed diene polymers by reacting the same with a compound which has a moiety which will graft onto the polymer and which also has a protected thiol group. Following grafting, the free mercaptan group can be regenerated to provide the polymer having the desired pendant mercaptan groups.

Illustrative of other methods of modifying the preformed polymer or of providing the desired pendant free mercaptan groups on the diene polymer is the use of thioacids such as thioacetic acid in place of the $H_2S$ as mentioned hereinbefore followed by a hydrolysis treatment to form the mercaptan group.

The foregoing methods of preparing mercapto-functional diene polymers are well known and can be used to attach the mercaptan groups either directly to the polymer chain or to the polymer chain through organic moieties. These and any other such known methods and any mercapto-functional diene polymers prepared by such methods which are polymerizable, organosolvent soluble, unsaturated diene polymers having pendant mercaptan groups are useful in the present invention. The reaction with $H_2S$ as described above is the preferred method of preparing the mercapto-functional diene polymers.

The mercapto-functional diene polymer can be used in any amount up to about 50% by weight based on the total weight of the monomer in the monomer composition and preferably from about 0.05% to about 10.0% by weight. More preferably, the mercapto-functional diene polymer is used in an amount of from about 0.05% to about 1.0% and most preferably from about 0.1% to about 0.5% by weight.

The free-radical polymerization can, in accordance with the method of the present invention, be accomplished using the various conventional methods of polymerization, viz., bulk, or mass, or so-called oil-phase polymerization of vinyl halide; solution polymerization where the vinyl halide is dissolved in a solvent; suspension, or bead, or granular polymerization where the vinyl halide is suspended in the form of large droplets in an aqueous medium generally containing a non-emulsifying suspending agent such as hydroxyl methyl cellulose or polyvinyl alcohol; and emulsion polymerization where the vinyl halide is emulsified in water by means of a surface-active emulsifying agent, though suspension polymerization is preferred. Details of these methods of polymerization generally are found in "Unit Processes in Organic Synthesis" by F. H. Groggins, third edition, pages 847–858 (published by McGraw-Hill Book Company, Inc., New York, 1947) and details of the methods of polymerizing vinyl halides are found in "Vinyl and Related Polymers" by C. E. Schildknecht, pages 392–398 (published by John Wiley and Sons, Inc., New York, 1952). Variations of the conditions of reaction as generally outlined in the art depending on the type of monomer composition, initiator system, and type of polymerization procedure selected are within the purview of the skilled artisan.

For use in suspension polymerization, various suspending agents such as gelatin, hydroxymethyl cellulose, hydroxyethyl cellulose, hydroxypropyl cellulose, carboxymethyl cellulose, talc, clay, polyvinyl alcohol and the like can be used in the method of the present invention. Other suspending agents which are known to be useful in the suspension polymerization of vinyl halides can also be used. The type and amount of the suspending agent used has, as is known, some influence on the particle size of the finally obtained product. The exact amounts of suspending agent and type can be selected by the skilled artisan so as to provide the particle size of product desired. Various other additives, such as thermal stabilizers, and the like, which are normally utilized in the polymerization can also be included. Suspension polymerization techniques are generally preferred in that the polymerization is easier to conduct and the product obtained has a particle size which is more easily handled and used by polymer processors.

Various emulsifying agents which can be used in emulsion polymerization of vinyl halide are illustrated by sodium lauryl sulfate, potassium stearate, alkyl benzene sulfonate, and ammonium dialkyl sulfosuccinate and can be used in the practice of the present invention. Other emulsifying agents which are also known to be useful in emulsion polymerization of vinyl halides can also be used. The exact amounts of the emulsifying agent and a type which is used are easily determined by the skilled artisan. In general, any of the additives such as catalysts and stabilizers, which are normally used in emulsion polymerization of vinyl halides can be utilized in the practice of the present invention. The product obtained from the emulsion polymerization which is in the form of a latex can be utilized per se or the latex can be coagulated to precipitate the polymer articles which can then be dried and processed into any desired form by polymer processor.

The solvents which are used in solution polymerization can be those in which only the monomer is soluble and those in which both the monomer and resulting polymer are soluble, the former solvents being preferred. Illustrative of the monomer soluble, polymer insoluble solvents which can be used in the performance of a solution polymerization of vinyl halides are: pentane, hexane, benzene, toluene and cyclohexane. Illustrative of monomer-polymer solvents which can be used in the solution polymerization of vinyl halides are: cyclohexanone, tetrahydrofuran, dimethyl sulfoxide, and dimethyl formamide. A mixture of solvents can also be used to reduce cost, e.g., as by the use of an expensive solvent diluted with an inexpensive non-solvent or weak solvent. Illustrative of solvent mixtures are: tetrahydrofuran and toluene or petroleum ether. The foregoing solvents and mixtures are given as illustrative and are in no way intended to be inclusive of all the possible solvents and mixtures thereof which can be utilized.

The polymerization of the vinyl halide monomers is a free-radical polymerization reaction and should be conducted in the presence of a free-radical initiator. Useful free-radical initiators are organic or inorganic peroxides, persulfates, ozonides, hydroperoxides, peracids and percarbonates, azo compounds, diazonium salts, diazotates, peroxysulfonates, trialkyl borane-oxygen systems, and amine oxides. Azobisisobutyronitrile is particularly useful in the present invention. The catalyst is used in concentrations ranging from about 0.01 to about 1.0% by weight based on the total weight of the monomers. For use in mass, suspension, and solution polymerization, the catalysts which are soluble in the organic phase, such as benzoyl peroxide, diacetyl peroxide, azobisisobutyronitrile, or diisopropyl peroxydicarbonate, azobis ($\alpha$-methyl-$\gamma$-carboxybutyronitrile), caprylyl peroxide, lauroyl peroxide, azobisisobutyramidine hydrochloride, $\tau$-butyl peroxypivalate, 2,4-dichlorobenzoyl peroxide, azobis($\alpha$-$\gamma$-dimethylvaleronitrile) are generally used. For use in emulsion polymerization, water soluble catalysts such as ammonium persulfate, hydrogen peroxide are used. Preferably, the initiator which is used is chosen from a group of initiators known in the prior art as the "hot catalysts" or those which have a high degree of free-radical initiating activity. Initiators with a lower degree of activity are less desirable in that they require longer polymerization times. Also, long polymerization times may cause preliminary product degradation evidenced by color problems, e.g., pinking. Other known free-radical initiating catalysts, such as light illumination or irradiation with gamma-ray can also be used.

The polymerization of the monomers is conducted at temperatures varying between —80° C. to about 120° C. for varying periods of time depending on the type of monomers utilized and the polymerization technique employed. The choice of a specific reaction temperature is dependent to a large extent on the initiator which is utilized and the rate of polymerization which is desired. Generally, for suspension polymerizations, temperatures of about 40° C. to 70° C. in the presence of an azo type initiator have been found to be effective.

It has also been found that the relative viscosity of the polymer is dependent to some degree on the concentration of the diene polymer and also to the time and temperature of polymerization. The relative viscosity can be increased by increasing the amount of the mercapto-modified diene polymer which is used. Increases as to time and temperature affect the polymerization rate and effect slight increases in the relative viscosity of the produced polymer. Thus, by varying time, temperature and concentration of the mercapto-modified diene polymer, polymers of varying relative viscosities can be obtained and this provides greater latitude in the choice of polymerization conditions. Variation is within the purview of the skilled artisan.

In any of the foregoing polymerization procedures, any other additives which are now commonly utilized can be included within the polymerization mixture. Other procedures such as short-stopping the polymerization at a desired point can also be utilized in accordance with the present invention.

The polymerization products of the present invention can be admixed with various conventional inert additives such as fillers, dyes, and pigments. Also the polymerization products can be admixed with impact modifiers, plasticizers, lubricants, additional thermal stabilizers, and ultra-violet light stabilizers as desired.

The invention is further illustrated in the examples which follow using as representative of the various polymerization systems, the preferred suspension polymerization system:

EXAMPLES

Suspension polymerization procedure

The following suspension polymerization procedure is used unless otherwise indicated. The reaction mixture or charge is sealed in a one quart soda bottle, the bottle is immersed in a temperature controlled water bath maintained at 58° C. and the polymerization is conducted for 16 hours. The bottles are rotated end over end at 41 revolutions per minute in the bath to provide agitation. The charge consists of the following materials in amounts given in approximate parts by weight:

| Charge: | Parts by weight (dry) |
|---|---|
| Vinyl chloride | 100 |
| Water (deionized) | 233 |
| Suspending agent (hydroxymethylcellulose) | 0.167 |
| Initiator (azobisisobutyronitrile) | 0.2 |
| Mercapto-modified diene polymer | 0.2 |

EXAMPLE 1

A polymer is prepared using, as the diene polymer having pendant mercaptan groups, a viscous, vinyl chloride soluble low molecular weight polymer which is predominantly 1,2-polybutadiene homopolymer having an average of 8 pendant mercaptan groups per molecule and which homopolymer has an average molecular weight of about 1200. The prepared polymer has a relative viscosity of about 2.17 as measured at 30° C. using a solution of 1 gram of polymer dissolved in 100 grams of cyclohexanone in a Ubbelohde viscosimeter.

The polymerization procedure set forth above operates equally as well to provide the desired final product when other suspending agents, e.g., gelatin, polyvinyl alcohol, hydroxypropyl cellulose, carboxymethyl cellulose, hydroxyethyl cellulose, talc and clay, are used in place of the hydroxymethyl cellulose. Similarly, the azobisisobutyronitrile initiator can be replaced by lauroyl peroxide, diisopropylperoxy dicarbonate, or t-butyl peroxypivalate initiators.

The approximation of actual processing conditions and the determination of the processability of a polymer can be done in a laboratory by means of a fusion torque rheometer. The polymer in powdered form is placed in the instrument and is fused under the influence of heat and shear. The instrument, which is basically a dynamometer, measures the torque force required to maintain mixer rotors revolving at a constant speed while the polymer is being fused. The instrument comprises a heated rotor cavity of measured size having rotors of the Banbury mixer type mounted therein. The rotors are driven by an electric motor suspended between two bearing blocks through which extends the main shaft of the motor. A weighted balance bar is attached to the motor to compensate for the torque force required in operating the rotors. Attached to the balance bar is a weight measuring device which can be read visually and which is provided with a scribe for recording measured weights on a sheet of recording paper. A tachometer and control circuit is used to maintain the number of revolutions of the rotors constant. A circulatory oil temperature control system is used to control the temperature within the rotor cavity. The test comprises inserting a measured amount of polymer in powdered form into the rotor cavity and measuring the resistance torque on the rotors developed by the sample as it begins to melt. This resistance causes the electric motor to swing in a direction opposite the direction of shaft rotation. This swinging motion is transmitted by the balance bar to the weight measuring device which determines the number of meter-grams of reverse force necessary to offset the swinging motion and hence the torque being applied to the rotors. The torque generally rises from a low point when the sample of polymer is in powdered form to a high point at flux after which the torque subsides to an intermediate equilibrium point or equilibrium torque. The torque remains constant until the polymer degrades whereupon the torque increases due to polymer cross-linking. The equilibrium torque value determines the amount of work in meter-grams which must be applied to the polymer to process the same. The tests are conducted using a 60 cm.³ sample bowl using Banbury type rotors adjusted to operate at 60 revolutions per minute at a temperature of 180° C. The test samples comprise 100 parts by weight of polymer, 3 parts by weight of a stabilizer (Thermolite 31 which is a sulfur-containing organotin compound manufactured by Metal & Thermit Corporation, Rahway, New Jersey) and 0.5 part by weight of a lubricant (calcium stearate). Values reported for fusion torque rheology are in meter-grams and are for equilibrium torque.

TABLE

| | Relative viscosity | Equilibrium torque in meter-grams |
|---|---|---|
| Product of Example 1 | 2.17 | 1,800 |
| Conventional polyvinyl chloride homopolymer | 2.12 | 2,200 |
| Conventional polyvinyl chloride homopolymer | 1.98 | 1,800 |

The relative viscosity data in the table is an indication of molecular weight. Generally, as the relative viscosity increases so does the molecular weight. And, generally, as the relative viscosity increases so does the amount of work required to process the polymer. The product of Example 1, as can be seen from the table, has approximately the same relative viscosity as the first listed conventional polyvinyl chloride homopolymer. However, the amount of work necessary to reach equilibrium torque is substantially less for the product of Example 1 as compared to the amount required for the polyvinyl chloride homopolymer. It can also be seen that the product of the example requires about the same amount of work to process at equilibrium torque as the second listed polyvinyl chloride homopolymer which is of substantially lower molecular weight as indicated by its relative viscosity.

The foregoing examples have illustrated the method of the present invention using vinyl chloride as the vinyl halide monomer. Other vinyl halide monomers such as vinyl bromide, vinyl iodide, vinylidene chloride, vinylidene bromide, vinylidene iodide and mixtures thereof can be substituted for the vinyl chloride with equal facility. Vinyl fluoride and vinylidene fluoride which have very low vapor pressures can also be used in high pressure polymerization vessels. As illustrative, 155 parts vinylidene chloride or 90 parts vinyl chloride/15.5 parts vinylidene chloride can be used in place of the 100 parts vinyl chloride with equal facility.

Various copolymers and terpolymers using non-vinyl halide type monomers in combination with the vinyl halide monomer can also be prepared with equal facility. As illustrative, 80 parts vinyl chloride/15.5 parts vinylidene chloride/27.5 parts diethyl fumarate, or 90 parts vinyl chloride/13.75 parts vinyl acetate, or 80 parts vinyl chloride/41.5 parts monomethyl maleate, or 90 parts vinyl chloride/16 parts ethyl acrylate, or 90 parts vinyl chloride/8.5 parts acrylonitrile, or 90 parts vinyl chloride/11.5 parts vinyl ethyl ether can be used in place of the 100 parts vinyl chloride in the preceding examples. Any other non-vinyl halide type monomers such as those listed hereinbefore can be substituted with equal facility to prepare copolymers and terpolymers.

The foregoing example has illustrated the method of the present invention using a polybutadiene homopolymer having pendant mercaptan groups. Other diene polymers such as styrene/butadiene copolymers, and various other butadiene copolymers, polyisoprene, natural rubber, polychloroprene, and copolymers thereof each having been modified to have pendant mercaptan groups can also be used with equal facility to prepare polymers in accordance with the method of the invention. The mercapto-modified diene polymers can be in the 1,2 form, the cis-1,4- or trans-1,4- form, or mixtures thereof.

The polymers prepared in accordance with the present invention can be used in applications such as the preparation of calendered film, blow molded bottles, extruded flat bed and blown film, extruded articles, tubing, in injection molding, fluidized bed coating, electrostatic powder spraying, rotational casting, additives to other polymers to increase toughness of the resulting blend or wherever polyvinyl chloride is presently used. It is understood that the polymers of the invention can be compounded with additives usually employed in the coating, impregnating and molding composition arts.

Thus, and in accordance with the present invention, there is provided a method for the preparation of a new class of vinyl halide polymers which exhibit improved processing characteristics, without sacrificing physical properties.

What is claimed is:

1. A method for preparing vinyl halide polymers exhibiting improved processing characteristics without sacrificing physical properties comprising polymerizing in the presence of a free-radical initiator an ethylenically unsaturated monomer composition containing at least 50% of vinyl halide of the formula:

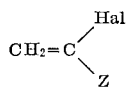

wherein Z is hydrogen or halogen and Hal means halogen, in the presence of a minor amount by weight based on the total weight of the monomer in said monomer composition, of a polymerizable, organosolvent-soluble, unsaturated diene polymer having pendant mercaptan groups.

2. A method as recited in claim 1 wherein said diene polymer is present in an amount of from about 0.05% to about 10.0% by weight.

3. A method as recited in claim 1 wherein said diene polymer is present in an amount of from about 0.05% to about 1.0% by weight.

4. A method as recited in claim 1 wherein said diene polymer is present in an amount of from about 0.1% to about 0.5% by weight.

5. A method as recited in claim 1 wherein said diene polymer has a molecular weight of below 20,000.

6. A method as recited in claim 1 wherein said diene polymer has a molecular weight of below 5,000.

7. A method as recited in in claim 1 wherein said diene polymer has a molecular weight of below 2,500.

8. A method as recited in claim 1 wherein said diene polymer is a polybutadiene having at least 3 pendant mercaptan groups per molecule and having a molecular weight of below 2,500.

9. A method as recited in claim 8 wherein at least 65% of said polybutadiene is in the 1,2- form.

10. A method as recited in claim 8 wherein at least 80% of said polybutadiene is in the 1,2- form.

11. A method as recited in claim 1, wherein said diene polymer is a styrene/butadiene copolymer containing from about 50% to about 90% butadiene and at least 10% styrene and having at least 3 pendant mercaptan groups per molecule and having a molecular weight of below 2,500.

12. A method as recited in claim 1 wherein said diene polymer is a polychloroprene having at least 3 pendant mercaptan groups per molecule and having a molecular weight of below 2,500.

13. A method as recited in claim 1 wherein said diene polymer is a butadiene/acrylonitrile copolymer having at least 3 pendant mercaptan groups per molecule and having a molecular weight of below 2,500.

14. A method as recited in claim 1 wherein said diene polymer is a polyisoprene having at least 3 pendant mercaptan groups per molecule and having a molecular weight of below 2,500.

15. A method as recited in claim 1 wherein said monomer compositions consists of 100% vinyl halide.

16. A method as recited in claim 15 wherein said vinyl halide is vinyl chloride.

17. A method as recited in claim 1 wherein said polymerization is conducted using suspension polymerization techniques.

18. An improved group of vinyl halide polymers which exhibit improved processing characteristics without sacrificing physical properties prepared by the free-radical polymerization of an ethylenically unsaturated monomer composition containing at least 50% of vinyl halide of the formula:

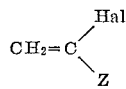

wherein Z is hydrogen or halogen and Hal means halogen, in the presence of a minor amount by weight based on the total weight of the monomer in said monomer composition, of a polymerizable, organosolvent-soluble, unsaturated diene polymer having pendant mercaptan groups.

19. A vinyl halide polymer as recited in claim 18 wherein said monomer composition consists of 100% vinyl halide monomer.

20. A vinyl halide polymer as recited in claim 19 wherein said vinyl halide monomer is vinyl chloride.

21. A vinyl halide polymer as recited in claim 18 wherein said diene polymer is present in an amount of from about 0.05% to about 10.0% by weight.

22. A vinyl halide polymer as recited in claim 18 wherein said diene polymer is present in an amount of from about 0.05% to about 1.0% by weight.

23. A vinyl halide polymer as recited in claim 18 wherein the diene polymer is present in an amount of from about 0.1% to about 0.5% by weight.

24. A vinyl halide polymer as recited in claim 18 wherein said diene polymer has a molecular weight of below about 5,000.

25. A vinyl halide polymer as recited in claim 18 wherein said diene polymer has a molecular weight of between 300 and 2,500.

26. A vinyl halide polymer as recited in claim 18 wherein said diene polymer is a polybutadiene having at least 3 pendant mercaptan groups per molecule and an average molecular weight of between about 300 and about 2,500.

27. A vinyl halide polymer as recited in claim 26 wherein at least 65% of said polybutadiene is in the 1,2- form.

28. A vinyl halide polymer as recited in claim 26 wherein at least 80% of said polybutadiene is in the 1,2- form.

29. A vinyl halide polymer as recited in claim 18 wherein said diene polymer is a styrene/butadiene copolymer containing from about 50% to about 90% butadiene and at least 10% styrene and having at least 3 pendant mercaptan groups per molecule and having a moledular weight of below 2,500.

30. A vinyl halide polymer as recited in claim 18 wherein said diene polymer is a polychloroprene having at least 3 pendant mercaptan groups per molecule and having a molecular weight of below 2,500.

31. A vinyl halide polymer as recited in claim 18 wherein said diene polymer is a butadiene/acrylonitrile copolymer having at least 3 pendant mercaptan groups per molecule and having a molecular weight of below 2,500.

32. A vinyl halide polymer as recited in claim 18 wherein said diene polymer is a polyisoprene having at least 3 pendant mercaptan groups per molecule and having a molecular weight of below 2,500.

33. A vinyl halide polymer as recited in claim 18 wherein said polymer is prepared by suspension polymerization techniques.

References Cited

UNITED STATES PATENTS

| 3,242,231 | 3/1966 | Graham et al. | 260—877 |
|---|---|---|---|
| 3,369,040 | 2/1968 | De Acetis | 260—468 |

FOREIGN PATENTS

| 653,698 | 12/1962 | Canada | 260—877 |

JOSEPH L. SCHOFER, Primary Examiner

R. A. GAITHER, Assistant Examiner

U.S. Cl. X.R.

260—877